United States Patent [19]

Noguchi et al.

[11] 4,089,602

[45] May 16, 1978

[54] AUTOMATIC SHUTDOWN SYSTEM FOR ELECTROPHOTOGRAPHIC APPARATUS

[75] Inventors: Koichi Noguchi, Machida; Masayosi Watanuki, Tokyo; Takeshi Narimatsu, Sagamihara; Mitsutaka Yoshida, Machida, all of Japan

[73] Assignee: Ricoh Company, Ltd., Tokyo, Japan

[21] Appl. No.: 731,168

[22] Filed: Oct. 12, 1976

[30] Foreign Application Priority Data

Dec. 20, 1975 Japan ............................... 50-152115

[51] Int. Cl.$^2$ ............................................ G03B 27/76

[52] U.S. Cl. ........................................... 355/69; 320/1

[58] Field of Search ....................... 355/14, 67, 68, 69; 320/1

[56] References Cited

U.S. PATENT DOCUMENTS 3,692,401 9/1972 Kawai .................................. 354/67

*Primary Examiner*—Donald A. Griffin
*Assistant Examiner*—William B. Perkey
*Attorney, Agent, or Firm*—Frank J. Jordan

[57] ABSTRACT

A flash tube is utilized as an imaging light source for a moving photoconductive belt or the like. A capacitor connected across the flash tube is charged from a power source. The flash tube is triggered when the voltage across the capacitor reaches a sufficient level to discharge the capacitor through the tube thereby firing the tube which emits an intense and brief flash of light for illuminating a document and imaging the photoconductive belt. A failure sensor produces a failure signal in response to a sheet jam or the like. A voltage comparator produces an enable signal when the voltage across the capacitor is sufficient to fire the flash tube. A trigger signal generator triggers the flash tube and shuts down the apparatus in response to the failure and enable signals in coincidence to discharge the capacitor and the photoconductive belt.

3 Claims, 2 Drawing Figures

AUTOMATIC SHUTDOWN SYSTEM FOR ELECTROPHOTOGRAPHIC APPARATUS

BACKGROUND OF THE INVENTION

The present invention relates to an automatic shutdown system for an electrophotographic copying machine.

An electrophotographic copying machine to which the present invention constitutes an improvement generally comprises an endless belt formed with an outer photoconductive surface. The belt is electrostatically charged and a light image of an original document to be copied is radiated onto the belt thereby causing local photoconduction and dissipation of the electrostatic charge to form an electrostatic image on the belt which is subsequently developed through the application of a toner substance thereto. The toner image is transferred and fixed to a copy sheet to provide a permanent copy of the original document.

The light image is radiated onto a flat portion of the belt by an imaging system comprising a flash tube to illuminate the document. Although the belt is continuously moving, duration of the flash from the flash tube is so brief that a sharp image is formed regardless of the movement of the belt. A discharge capacitor is connected across the flash tube and is charged from a voltage source. When sufficient charge is accumulated on the capacitor, the tube is fired so that the capacitor is discharged through the tube thereby producing an intense flash of light to illuminate the document and image the belt.

Such a copying machine further typically comprises one or more failure sensors to detect a sheet jam or the similar failure condition and shut down the apparatus in response thereto. However, if the failure occurs after a portion of the belt is electrostatically charged, when operation of the machine is restored after repair of the failure condition and the charged portion of the belt is developed, the charged area will constitute a completely black toner image. This condition results in waste of toner and also an extreme burden on a cleaning unit provided to remove residual toner substance from the belt prior to the subsequent copying operation. In addition, the capacitor must have a very large value of capacitance and be charged to a high voltage in order to provide the required luminous intensity when discharged through the flash tube. If the apparatus is simply shut down in response to a failure condition, a voltage will remain on the capacitor constituting a shock hazzard for repair personnel.

SUMMARY OF THE INVENTION

It is therefore an object of the present invention to provide an automatic shutdown system for an electrophotographic copying machine which prevents the formation of black toner image areas on a photoconductive member when the machine is shut down in response to the detection of a failure condition.

It is another object of the present invention to provide an automatic shutdown system which triggers an imaging flash tube as soon as the voltage across a discharge capacitor is sufficient to fire the tube in response to a failure condition to discharge the capacitor and a photoconductive belt.

It is another object of the present invention to eliminate the shock hazzard constituted by a charged capacitor when an electrophotographic apparatus is automatically shut down in response to a detected failure condition.

It is another object of the present invention to provide a generally improved automatic shutdown system for an electrophotographic copying machine.

Other objects, together with the foregoing, are attained in the embodiment described in the following description and illustrated in the accompanying drawings.

DESCRIPTION OF THE PREFERRED EMBODIMENT

While the automatic shutdown system for an electrophotographic copying machine of the invention is susceptible of numerous physical embodiments, depending upon the environment and requirements of use, substantial numbers of the herein shown and described embodiment have been made, tested and used, and all have performed in an eminently satisfactory manner.

Figure 1:
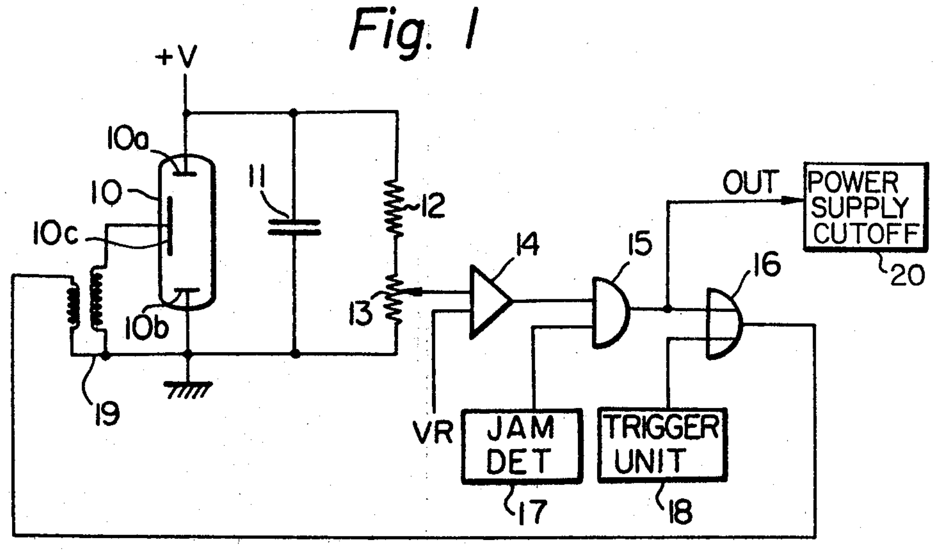
FIG. 1 is an electrical schematic diagram of an automatic shutdown system for an electrophotographic copying apparatus embodying the present invention.

Referring now to FIG. 1 of the drawing, an automatic shutdown system for an electrophotographic copying apparatus comprises a flash tube 10. Although not shown, the flash tube 10 is utilized to illuminate an original document for copying and thereby radiate a light image of the document onto a continuously moving photoconductive belt. A charging unit applies an electrostatic charge to the belt which is locally dissipated through photoconduction by the light image to form an electrostatic image. A developing unit applies a toner substance to the belt after imaging and a transfer unit transfers the toner image to a copy sheet. A fixing unit fixes the toner image to the copy sheet to provide a permanent copy and a cleaning unit removes residual toner from the belt prior to charging for the next copying operation.

The flash tube 10 is of conventional design and comprises electrodes **10*a* and 10*b* across which are connected a discharge capacitor 11. The electrode 10*a* is connected to a DC voltage source +V and the electrode 10*b* is grounded. A resistor 12 and a potentiometer 13 are connected in series across the capacitor 11 to constitute a voltage divider. The slider of the potentiometer 13 is connected to an input of a voltage comparator 14. A reference or comparison voltage VR is applied to another input of the voltage comparator 14**.

The output of the voltage comparator 14 is connected to an input of an AND gate 15, the output of which is connected to an input of an OR gate 16. The output of a jam detector 17 is connected to another input of the AND gate 15. If desired, the jam detector 17 may be replaced by a sensor to detect a diffent failure mode of the copying machine or either of several failure modes.

The output of a copy trigger unit 18 is connected to another input of the OR gate 16, the output of which is grounded through the primary winding of a trigger transformer 19. The secondary winding of the trigger transformer 19 is connected between a trigger electrode **10*c* of the flash tube 10** and ground.

Figure 2:
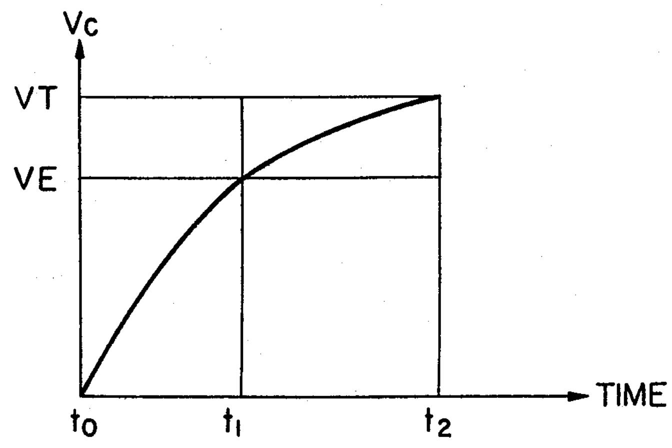
FIG. 2 is a timing diagram illustrating the principles of the present invention.

As illustrated in FIG. 2, the capacitor 11 is charged at an exponential rate from the voltage source +V. The trigger unit 18 produces an electrical copy trigger signal which is gated through the OR gate 16 to the trigger transformer 19 to fire the flash tube 10 and image the belt. Assuming that a copy trigger signal is produced at a time *t0* in FIG. 2, control circuity (not shown) is designed to allow the trigger unit 18 to produce another copy trigger signal after a time *t2* when the voltage VC across the capacitor 11 has reached a substantially maximum value VT. This time duration between trigger signals enables the belt to move so that a blank area thereof reaches the imaging position and also allows the capacitor 11 to change sufficiently.

However, the voltage VC across the capacitor 11 is sufficient to fire the flash tube 10 at reduced power after a time *t1* when the voltage VC reaches a value VE. The slider of the potentiometer 13 is set so that the voltage at the slider is equal to the reference voltage VR when the voltage VC across the capacitor 11 is equal to VE. The comparator 14 thereby produces a high output constituting an electrical enable signal while the voltage across the capacitor 11 is greater than VE, indicating that the flash tube 10 may be fired.

The output of the voltage comparator 14 has no effect as long as the copying machine is operating normally. However, when a sheet jam occurs, the jam detector 17 produces a high output which constitutes an electrical failure signal which is applied to the AND gate 15. The AND gate 15 thereby produces a high output which constitutes and electrical failure trigger signal which is gated through the OR gate 16 to the trigger transformer 19 to fire the flash tube 10. The flash tube 10 is triggered when the AND gate 15 receives high output from the voltage comparator 14 and the jam detector 17 in coincidence. In other words, the flash tube 10 is fired as soon after a jam is detected as the voltage VC across the capacitor 11 is sufficient to fire the tube 10. If the voltage VC across the capacitor 11 is higher than VE when th jam is detected, the flash tube 10 will of course be triggered immediately. The output of the AND gate 15 is also fed as indicated in FIG. 1 to a power supply cutoff 20 to cutoff the power supply (not shown) of the copying machine to shut down the copying machine at the same time the flash tube 10 is fired.

The firing of the flash tube 10 discharges the capacitor 11 so that the capacitor 11 will not constitute a shock hazzard to personnel clearing the sheet jam or effecting repairs. In addition, the light flash from the flash tube 10 discharges the photoconductive belt so that a black toner image area will not be produced. In this manner, waste of toner substance and overloading of the cleaning unit is prevented.

If desired, a flip-flop may be provided between the jam detector 17 and the AND gate 15 which is set by the failure signal and reset by a reset button, although not shown. The resistor 12, potentiometer 13 and voltage comparator 14 may be replaced by, for example, a monostable multivibrator which is triggered by the output of the trigger unit 18 to generate a pulse between *t0* and *t1* to inhibit the AND gate 15.

Many other modifications within the scope of the invention will become possible for those skilled in the art after receiving the teaching of the present disclosure.

What is claimed is:

1. In an electrophotographic apparatus including a flash tube constituting an imaging light source, a discharge capacitor connected across the flash tube, power source means for charging the capacitor, a cutoff means for cutting off the power source means and a failure detector for sensing a failure condition of the apparatus and producing an electrical failure signal in response thereto, the combination comprising:

voltage sensing means for sensing whether a voltage across the capacitor is sufficient to fire the flash tube and producing an electrical enable signal while said voltage is sufficient; and failure trigger signal generating means responsive to the failure signal and the enable signal for producing an electrical failure trigger signal to fire the flash tube and cutoff the power source means in response to the failure trigger signal and the enable signal in coincidence.

2. An apparatus as in claim 1, in which the voltage sensing means comprises a voltage comparator responsive to said voltage, the failure trigger signal generating means comprising an AND gate having inputs connected to outputs of the failure detector and the voltage comparator respectively an output of the AND gate being operatively connected to the flash tube and the cutoff means.

3. An apparatus as in claim 2, further comprising an OR gate having an input connected to the output of the AND gate and an output operatively connected to the flash tube in such a manner that the output of the AND gate is connected to the flash tube through the OR gate, the apparatus further comprising copy trigger signal generating means for producing an electrical copy trigger signal to fire the flash tube for electrophotographic imaging, an output of the copy trigger signal generating means being connected to another input of the OR gate.

* * * * *